United States Patent
Haggerty et al.

(10) Patent No.: US 8,707,022 B2
(45) Date of Patent: Apr. 22, 2014

(54) APPARATUS AND METHODS FOR DISTRIBUTING AND STORING ELECTRONIC ACCESS CLIENTS

(75) Inventors: David T. Haggerty, San Francisco, CA (US); Jerrold Von Hauck, Windermere, FL (US); Kevin McLaughlin, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/095,716

(22) Filed: Apr. 27, 2011

(65) Prior Publication Data
US 2012/0260086 A1    Oct. 11, 2012

Related U.S. Application Data

(60) Provisional application No. 61/472,115, filed on Apr. 5, 2011.

(51) Int. Cl.
*H04L 29/06*    (2006.01)

(52) U.S. Cl.
USPC ............................... 713/150; 380/279; 726/9

(58) Field of Classification Search
USPC ......................................................... 713/150
See application file for complete search history.

(56) References Cited

U.S. PATENT DOCUMENTS

| | | | |
|---|---|---|---|
| 6,372,974 B1 | 4/2002 | Gross et al. | |
| 6,799,155 B1 * | 9/2004 | Lindemann et al. | 703/24 |
| 6,980,830 B2 * | 12/2005 | Ahonen | 455/558 |
| 7,350,230 B2 * | 3/2008 | Forrest | 726/9 |
| 7,363,056 B2 * | 4/2008 | Faisy | 455/558 |
| 8,064,597 B2 * | 11/2011 | Gehrmann | 380/247 |
| 8,135,825 B2 * | 3/2012 | Wendling | 709/224 |
| 8,553,883 B2 * | 10/2013 | Salmela et al. | 380/247 |
| 2004/0151135 A1 * | 8/2004 | Kitahama et al. | 370/328 |
| 2004/0204089 A1 * | 10/2004 | Castrogiovanni et al. | 455/558 |
| 2004/0240671 A1 * | 12/2004 | Hu et al. | 380/277 |
| 2005/0176465 A1 | 8/2005 | Fornell | |
| 2005/0210249 A1 * | 9/2005 | Lee et al. | 713/168 |

(Continued)

FOREIGN PATENT DOCUMENTS

| | | |
|---|---|---|
| DE | 102 15 861 A1 | 8/2003 |
| EP | 2 076 071 A | 7/2009 |

(Continued)

OTHER PUBLICATIONS

Clark. "Apple Patents 'SIM within' secure element technology." In: Near Field Communications World [online]. Dated Nov. 9, 2011. Retrieved on Jul. 13, 2012 from the Internet at URL:<http://www.nfcworld.com/2011/11/09/311213/apple-patents-sim-within-secure-element-technology/>.

*Primary Examiner* — David Garcia Cervetti
(74) *Attorney, Agent, or Firm* — Womble Carlyle Sandridge & Rice LLP

(57) ABSTRACT

Apparatus and methods for efficiently distributing and storing access control clients within a network. In one embodiment, the access clients include electronic Subscriber Identity Modules (eSIMs), and an eSIM distribution network infrastructure is described which enforces eSIM uniqueness and conservation, distributes network traffic to prevent "bottle necking" congestion, and provides reasonable disaster recovery capabilities. In one variant, eSIMs are securely stored at electronic Universal Integrated Circuit Card (eUICC) appliances which ensure eSIM uniqueness and conservation. Access to the eUICC appliances is made via multiple eSIM depots, which ensure that network load is distributed. Persistent storage is additionally described, for among other activities, archiving and backup.

22 Claims, 8 Drawing Sheets

(56) References Cited

U.S. PATENT DOCUMENTS

| | | | |
|---|---|---|---|
| 2006/0089124 A1* | 4/2006 | Frank et al. | 455/411 |
| 2006/0218284 A1* | 9/2006 | Kley | 709/227 |
| 2006/0253904 A1* | 11/2006 | Bhansali et al. | 726/13 |
| 2006/0265339 A1* | 11/2006 | Vakil et al. | 705/76 |
| 2006/0272034 A1* | 11/2006 | Bhansali et al. | 726/34 |
| 2006/0281442 A1* | 12/2006 | Lee et al. | 455/412.2 |
| 2007/0055897 A1* | 3/2007 | Bussan et al. | 713/300 |
| 2007/0167161 A1 | 7/2007 | Cheng et al. | |
| 2007/0171601 A1* | 7/2007 | Bloebaum | 361/658 |
| 2007/0177562 A1 | 8/2007 | Castrogiovanni et al. | |
| 2008/0060086 A1* | 3/2008 | Bhansali et al. | 726/35 |
| 2008/0098483 A1* | 4/2008 | Bhansali et al. | 726/26 |
| 2008/0109362 A1* | 5/2008 | Fransdonk | 705/51 |
| 2008/0127308 A1* | 5/2008 | Bhansali et al. | 726/3 |
| 2008/0132205 A1 | 6/2008 | Svensson | |
| 2008/0134284 A1* | 6/2008 | Bhansali et al. | 726/1 |
| 2008/0137843 A1* | 6/2008 | Bhansali et al. | 380/29 |
| 2008/0141383 A1* | 6/2008 | Bhansali et al. | 726/35 |
| 2008/0175390 A1* | 7/2008 | Alessio et al. | 380/278 |
| 2008/0243683 A1 | 10/2008 | Patel et al. | |
| 2008/0253564 A1 | 10/2008 | Kahn et al. | |
| 2008/0260149 A1* | 10/2008 | Gehrmann | 380/247 |
| 2008/0261561 A1* | 10/2008 | Gehrmann | 455/411 |
| 2008/0270307 A1 | 10/2008 | Olson | |
| 2008/0270602 A1* | 10/2008 | Bhansali et al. | 709/224 |
| 2008/0276326 A1* | 11/2008 | Bhansali et al. | 726/36 |
| 2009/0013179 A1* | 1/2009 | Jung et al. | 713/164 |
| 2009/0029738 A1 | 1/2009 | Kim et al. | |
| 2009/0070861 A1 | 3/2009 | Jain | |
| 2009/0077643 A1 | 3/2009 | Schmidt | |
| 2009/0125996 A1* | 5/2009 | Guccione et al. | 726/6 |
| 2009/0136028 A1* | 5/2009 | Card, II | 380/200 |
| 2009/0205028 A1 | 8/2009 | Smeets | |
| 2009/0210923 A1 | 8/2009 | Jogand-Coulomb | |
| 2010/0062808 A1 | 3/2010 | Cha et al. | |
| 2010/0088516 A1* | 4/2010 | Frank et al. | 713/168 |
| 2010/0115253 A1* | 5/2010 | Lipsky et al. | 713/1 |
| 2010/0210304 A1 | 8/2010 | Huslak | |
| 2010/0242100 A1 | 9/2010 | Korhonen | |
| 2010/0243736 A1* | 9/2010 | Chou et al. | 235/385 |
| 2010/0262829 A1 | 10/2010 | Brown et al. | |
| 2010/0306107 A1 | 12/2010 | Nahari | |
| 2010/0311468 A1 | 12/2010 | Shi et al. | |
| 2010/0325434 A1* | 12/2010 | Molaro | 713/168 |
| 2011/0029786 A1* | 2/2011 | Raffard et al. | 713/193 |
| 2011/0131421 A1* | 6/2011 | Jogand-Coulomb et al. | 713/189 |
| 2012/0060031 A1* | 3/2012 | Huang et al. | 713/168 |
| 2012/0108205 A1 | 5/2012 | Schell et al. | |
| 2012/0108207 A1* | 5/2012 | Schell et al. | 455/411 |
| 2012/0108294 A1* | 5/2012 | Kaul | 455/558 |
| 2012/0117635 A1* | 5/2012 | Schell et al. | 726/9 |
| 2012/0179722 A1* | 7/2012 | Kley | 707/783 |
| 2012/0196569 A1* | 8/2012 | Holtmanns et al. | 455/411 |
| 2013/0079059 A1* | 3/2013 | Huslak | 455/558 |

FOREIGN PATENT DOCUMENTS

| | | |
|---|---|---|
| EP | 2079256 | 7/2009 |
| EP | 2410777 | 1/2012 |
| EP | 2 448 216 A1 | 5/2012 |

\* cited by examiner

APPARATUS AND METHODS FOR DISTRIBUTING AND STORING ELECTRONIC ACCESS CLIENTS

PRIORITY AND RELATED APPLICATIONS

This application claims priority to U.S. Provisional Patent Application Ser. No. 61/472,115 filed Apr. 5, 2011 and entitled "APPARATUS AND METHODS FOR DISTRIBUTING AND STORING ELECTRONIC ACCESS CLIENTS", the foregoing being incorporated herein by reference in its entirety.

This application is also related to co-owned, co-pending U.S. patent application Ser. No. 13/080,558 filed on Apr. 5, 2011, and entitled "APPARATUS AND METHODS FOR CONTROLLING DISTRIBUTION OF ELECTRONIC ACCESS CLIENTS", Ser. No. 12/952,082 filed on Nov. 22, 2010 and entitled "WIRELESS NETWORK AUTHENTICATION APPARATUS AND METHODS", Ser. No. 12/952,089 filed on Nov. 22, 2010 and entitled "APPARATUS AND METHODS FOR PROVISIONING SUBSCRIBER IDENTITY DATA IN A WIRELESS NETWORK", Ser. No. 12/980,232 filed on Dec. 28, 2010 and entitled "VIRTUAL SUBSCRIBER IDENTITY MODULE DISTRIBUTION SYSTEM", and Ser. No. 12/353,227 filed on Jan. 13, 2009, and entitled "POSTPONED CARRIER CONFIGURATION", and U.S. Provisional Patent Application Ser. Nos. 61/472,109 filed on Apr. 5, 2011, and entitled "APPARATUS AND METHODS FOR STORING ELECTRONIC ACCESS CLIENTS" (now U.S. patent application Ser. No. 13/093,722 filed Apr. 25, 2011, of the same title), 61/407,858 filed on Oct. 28, 2010 and entitled "METHODS AND APPARATUS FOR ACCESS CONTROL CLIENT ASSISTED ROAMING" (now U.S. patent application Ser. No. 13/109,851 filed May 17, 2011, of the same title), 61/407,861 filed on Oct. 28, 2010 and entitled "MANAGEMENT SYSTEMS FOR MULTIPLE ACCESS CONTROL ENTITIES" (now U.S. patent application Ser. No. 13/079,614 filed on Apr. 4, 2011, of the same title"), 61/407,862 filed on Oct. 28, 2010 and entitled "METHODS AND APPARATUS FOR DELIVERING ELECTRONIC IDENTIFICATION COMPONENTS OVER A WIRELESS NETWORK" (now U.S. patent application Ser. No. 13/111,208 filed May 19, 2011, of the same title), 61/407,866 filed on Oct. 28, 2010 and entitled "METHODS AND APPARATUS FOR STORAGE AND EXECUTION OF ACCESS CONTROL CLIENTS" (now U.S. patent application Ser. No. 13/080,521 filed on Apr. 5, 2011, of the same title), 61/408,504 filed on Oct. 29, 2010 and entitled "ACCESS DATA PROVISIONING SERVICE" (now U.S. patent application Ser. No. 13/078,811 filed on Apr. 1, 2011, and entitled "ACCESS DATA PROVISIONING APPARATUS AND METHODS"), 61/409,891 filed on Nov. 3, 2010 and entitled "METHODS AND APPARATUS FOR ACCESS DATA RECOVERY FROM A MALFUNCTIONING DEVICE" (now U.S. patent application Ser. No. 13/287,874 filed Nov. 2, 2011, of the same title), 61/410,298 filed on Nov. 4, 2010 and entitled "SIMULACRUM OF PHYSICAL SECURITY DEVICE AND METHODS" (now U.S. patent application Ser. No. 13/080,533 filed on Apr. 5, 2011, of the same title), and 61/413,317 filed on Nov. 12, 2010 and entitled "APPARATUS AND METHODS FOR RECORDATION OF DEVICE HISTORY ACROSS MULTIPLE SOFTWARE EMULATION" (now U.S. patent application Ser. No. 13/294,631 filed Nov. 11, 2011, of the same title), each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of communications systems, and more particularly in one exemplary aspect to efficiently distribute and store virtual access control clients within a network.

2. Description of Related Technology

Access control is required for secure communication in most prior art wireless radio communication systems. As an example, one simple access control scheme might include: (i) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) executing on a physical Universal Integrated Circuit Card (UICC). The USIM access control client authenticates the subscriber to the UMTS cellular network. After successful authentication, the subscriber is allowed access to the cellular network. As used hereinafter, the term "access control client" refers generally to a logical entity, either embodied within hardware or software, suited for controlling access of a first device to a network. Common examples of access control clients include the aforementioned USIM, CDMA Subscriber Identification Modules (CSIM), IP Multimedia Services Identity Module (ISM), Subscriber Identity Modules (SIM), Removable User Identity Modules (RUIM), etc.

Traditionally, the USIM (or more generally "SIM") performs the well known Authentication and Key Agreement (AKA) procedure, which verifies and decrypts the applicable data and programs to ensure secure initialization. Specifically, the USIM must both (i) successfully answer a remote challenge to prove its identity to the network operator, and (ii) issue a challenge to verify the identity of the network.

While traditional SIM solutions are embodied within a removable Integrated Circuit Card (ICC) (also referred to as a "SIM card"), incipient research by the Assignee hereof is directed to virtualizing SIM operation within a software client executing within the mobile device. Virtualized SIM operation can reduce device size, increase device functionality, and provide greater flexibility.

Unfortunately, virtualized SIM operation also presents multiple new challenges for network operators and device manufacturers. For example, traditional SIM cards are manufactured and guaranteed by a trusted SIM vendor. These traditional SIM cards execute a single secure version of software that has been permanently "burned" to the SIM card. Once burned, the card cannot be tampered with (without also destroying the SIM card). Distribution of these cards is a simple process of shipping the cards to distribution centers, retail outlets, and/or customers.

In contrast, virtualized SIMs can be readily copied, multiplied, etc. Since each SIM represents a contracted for amount of access to finite network resources, illicit use of a virtualized SIM can greatly impact network operation and user experience. Accordingly, new distribution infrastructures are required for virtualized SIM delivery. Ideally, such new distribution infrastructures must (i) enforce SIM conservation, (ii) prevent excessive network traffic (also termed "bottle necking"), and (iii) offer reasonable disaster recovery capabilities.

SUMMARY OF THE INVENTION

The present invention addresses the foregoing needs by providing, inter alia, apparatus and methods for efficiently distributing virtual access control clients within a network.

In one aspect of the present invention, a method for efficiently distributing access control clients is disclosed. In one embodiment, the method includes: tracking one or more access control clients within a secure repository; encrypting an access control client uniquely for a target device; transmitting the encrypted access control client to one or more distribution locations, and removing the access control client from the secure repository. In one variant, the one or more distribution locations does not modify the encrypted access control client, and the target device is configured to download only a single encrypted access control client from only a single distribution location.

In another aspect of the invention, a method for efficiently distributing access control clients is disclosed. In one embodiment, the method includes storing an encrypted access control client at one or more distribution locations, and responsive to a request for the stored encrypted access control client, delivering the encrypted access control client; and responsive to the encrypted access control client being successfully delivered from any of the one or more distribution locations, deactivating the stored encrypted access control client. In one variant, the one or more distribution locations do not modify the encrypted access control client, and the encrypted access control client is configured for a unique target device.

The encrypted access control client may delivered in an uncontrolled fashion, with each stored encrypted access control client being associated with metadata. Metadata can include e.g., access control client identifying information, access control client issuer information, access control client account information, and/or access control client status information. In some variants, metadata is provided in response to a request for metadata associated with a specific access control client.

In yet another aspect of the invention, an appliance for efficiently distributing access control clients is disclosed. In one embodiment, the appliance includes: a signing appliance, the signing appliance configured to track one or more access control clients; a security module, the security module configured to uniquely encrypt an eSIM for a target device; a processor; and a storage device in data communication with the processor. The storage device includes computer-executable instructions that are configured to, when executed by the processor: responsive to a request for a tracked access control client from the target device, uniquely encrypt the requested access control client; transmit the encrypted access control client to one or more distribution locations, and update the signing appliance. In one variant, the one or more distribution locations do not modify the encrypted access control client, and the target device is configured to download only a single encrypted access control client from only a single distribution location, The appliance may additionally include secure storage for one or more locally stored encrypted access control clients. In one such variant, the one or more locally stored access control clients are encrypted uniquely for the appliance. In another such variant, the security module is additionally configured to decrypt eSIMs that are uniquely encrypted for the appliance.

In another embodiment, the one or more access control clients include electronic Subscriber Identity Modules (eSIMs), and the one or more distribution locations include eSIM depots.

In still another aspect of the invention, a depot for efficiently distributing access control clients is disclosed. In one embodiment, the depot includes: a network interface for communication with a network; a processor; and a storage device in data communication with the processor. The storage device includes computer-executable instructions that are configured to, when executed by the processor: store an access control client that has been encrypted for a target device; responsive to a request for the stored encrypted access control client received from a requester device, deliver the encrypted access control client to the requester device; and responsive to the encrypted access control client being successfully delivered to the target device, delete the stored encrypted access control client.

In another embodiment, the storage device is configured to store metadata associated with each access control client. In one such variant, the computer-executable instructions are additionally configured to, responsive to a request for metadata associated with a specific access control client, provide the requested metadata.

Further features of the present invention, its nature and various advantages will be more apparent from the accompanying drawings and the following detailed description.

Figure 1:
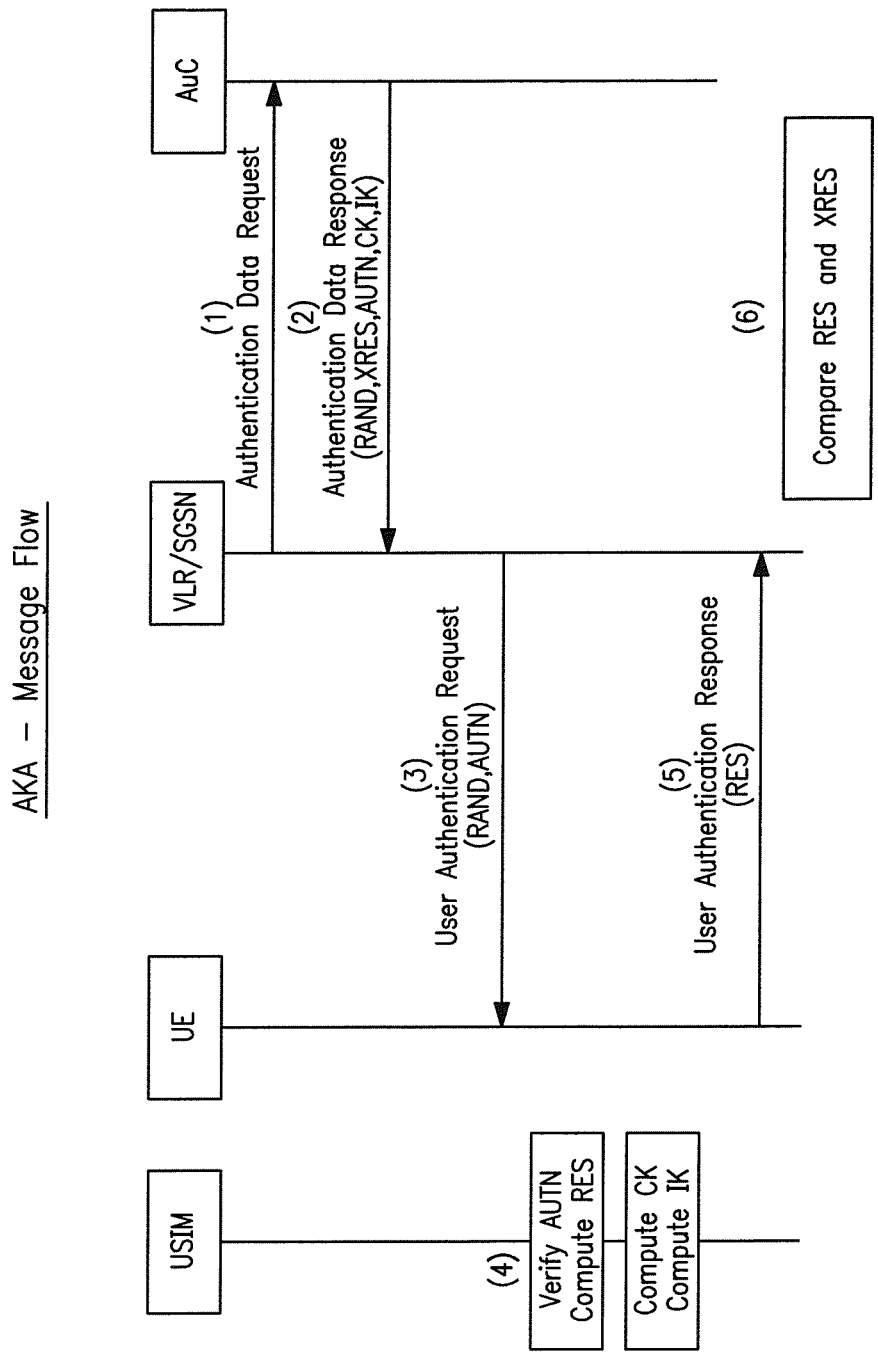
FIG. 1 graphically illustrates one exemplary Authentication and Key Agreement (AKA) procedure using a prior art USIM.

All Figures © Copyright 2011 Apple Inc. All rights reserved.

DETAILED DESCRIPTION OF THE INVENTION

Reference is now made to the drawings wherein like numbers refer to like parts throughout.
Overview The present invention provides, inter alia, methods and apparatus for efficiently distributing and storing access control clients within a network. In one embodiment, an electronic Subscriber Identity Module (eSIM) distribution network infrastructure is described which enforces eSIM uniqueness and conservation, and distributes network traffic to prevent "bottle necking" congestion. Additionally, one disclosed embodiment of the distribution network provides disaster recovery capabilities.

As described in greater detail herein, the exemplary network embodiment of the infrastructure for eSIM distribution includes three (3) logical entities: a number of eUICC appliances (or an "appliance cluster"), a number of eSIM depots, and persistent storage. Each eUICC appliance is further divided into a signing appliance, a security module, and secure storage. In one exemplary embodiment, the secure storage is composed of volatile memory (such as Random Access Memory (RAM), Static RAM (SRAM), Dynamic RAM (DRAM)).

The eUICC appliance enforces eSIM uniqueness and conservation within the network infrastructure. Specifically, the signing appliance tracks one or more distributed eSIMs, and the issued challenges and/or known statuses associated therewith. The signing appliance instructs the security module to perform encryption and decryption of eSIMs that the signing appliance has received, or that the signing appliance will transmit. The signing appliance can also securely store eSIMs within the secure storage of the eUICC appliance. Thus, in one aspect of the present invention, the eUICC appliance ensures that each eSIM is accounted for (while stored at the eUICC appliance), and that each eSIM is delivered specifically encrypted for a destination device.

The eSIM depot provides a distribution channel to prevent network "bottle-necking"; specifically, multiple eSIM depots can retain the same encrypted copy of an eSIM that has not yet been delivered to the destination eUICC. For example, the encrypted combination of eSIM, eUICC, and challenge can be cached in the eSIM depot for subsequent delivery. A device can retrieve the eSIM from any of the eSIM depots; even if one eSIM depot is unavailable, the device can retrieve the eSIM from any of the alternate eSIM depots. Once the device has received the eSIM, the device can decrypt and activate the eSIM.

In one exemplary embodiment of the invention, the system is further configured such that the device can only import a copy from any of the eSIM depots once; the other copies stored at the other eSIM depots are removed, deleted, or rendered inactive thereafter. The device itself may enforce this restriction, or the eSIM depots may maintain synchronization communication, such as via an internal synchronization communication.

Furthermore, the various devices may, in some embodiments, additionally periodically back up their contents to a persistent storage. The persistent storage stores backup data that has been encrypted with a key specific to the device. In the event of a disaster, the persistent storage can provide its backup data, when provided with the appropriate key. In one exemplary embodiment, the persistent storage is composed of non-volatile memory (such as Flash, Hard Disk Drives (HDD), etc).

A myriad of other schemes and embodiments for efficient distribution are also described in greater detail herein.

DETAILED DESCRIPTION OF EXEMPLARY EMBODIMENTS

Exemplary embodiments and aspects of the present invention are now described in detail. While these embodiments and aspects are primarily discussed in the context of Subscriber Identity Modules (SIMs) of a GSM, GPRS/EDGE, or UMTS cellular network, it will be recognized by those of ordinary skill that the present invention is not so limited. In fact, the various aspects of the invention are useful in any network (whether cellular, non-cellular wireless, or otherwise) that can benefit from storing and distributing access control clients to devices.

It will also be recognized that while the term "subscriber identity module" is used herein (e.g., eSIM), this term in no way necessarily connotes or requires either (i) use by a subscriber per se (i.e., the invention may be practiced by a subscriber or non-subscriber); (ii) identity of a single individual (i.e., the invention may be practiced on behalf of a group of individuals such as a family, or intangible or fictitious entity such as an enterprise); or (iii) any tangible "module" equipment or hardware.

Prior Art Subscriber Identity Module (SIM) Operation—

Within the context of the exemplary prior art UMTS cellular network, user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services. The USIM software is based on the Java Card™ programming language. Java Card is a subset of the Java™ programming language that has been modified for embedded "card" type devices (such as the aforementioned UICC).

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICC-ID) and a specific authentication key (K). The network operator stores the association in a registry contained within the network's Authentication Center (AuC). After personalization the UICC can be distributed to subscribers. Referring now to FIG. 1, one exemplary Authentication and Key Agreement (AKA) procedure using the aforementioned prior art USIM is illustrated in detail. During normal authentication procedures, the UE acquires the International Mobile Subscriber Identify (IMSI) from the USIM. The UE passes the IMSI to the Serving Network (SN) of the network operator or the visited core network. The SN forwards the authentication request to the AuC of the Home Network (HN). The HN compares the received IMSI with the AuC's registry and obtains the appropriate K. The HN generates a random number (RAND) and signs it with K using an algorithm to create the expected response (XRES). The FIN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE receives the RAND and AUTN, the USIM verifies if the received AUTN is valid. If so, the UE uses the received RAND to compute its own response (RES) using the stored K and the same algorithm that generated the XRES. The UE passes the RES back to the SN. The SN compares the XRES to the received RES and if they match, the SN authorizes the UE to use the operator's wireless network services.

The foregoing procedure of FIG. 1 is embodied within the physical media of the SIM card. Prior art SIM cards have at least two (2) distinct and desirable properties: (i) SIM cards provide cryptographically secured storage for SIM data (e.g., account information, encryption keys, etc.), and (ii) SIM cards cannot be easily cloned.

A prior art SIM card includes a processor and memory formed in a Universal Integrated Circuit Card (UICC). The SIM card may be filled with epoxy resin to prevent external probing of data signals on the UICC. Other tamper-proof structures may be included in the UICC if desired (e.g., shielding layers, masking layers, etc.) The SIM card has a secure interface to the processor, and the processor has an internal interface to the memory. The UICC receives power from the external device, which enables the processor to execute code from the memory component. The memory component itself is not directly accessible (i.e., internal filesystems are hidden from the user), and must be accessed via the processor.

During normal operation, the processor accepts a limited number of commands. Each of the commands is only conditionally accessible. Access conditions are constrained to the execution of commands to prevent unauthorized access. Access conditions may or may not be hierarchical e.g., authorization for one level may not automatically grant authorization for another level. For example, one set of access conditions may include: (i) always accessible, (ii) never accessible, (iii) accessible to a first account, (iv) accessible to a second account, etc. Conditional access is granted only after successful completion of an appropriate security protocol. Common methods for verifying identity may include a password or Personal Identification Number (PIN), challenge of a shared secret, etc.

Conditional access, limited command set, and protected memory space, ensure that the information stored within the SIM card is secure from external access. Cloning a SIM card would entail construction of a physical card, and construction of the internal filesystem and data. The combination of these features renders the physical SIM card impervious to practical forgery attempts.

Method—

As a brief aside, the terms "conservation", "conserve" and "conserved", as used herein refer without limitation to an element (either physical or virtual), that cannot be trivially multiplied or diminished. For example, a conserved eSIM cannot be copied or replicated during normal operation.

Additionally, as used herein, the term "uniqueness" as applied to an element (either physical or virtual), refers without limitation to the property whereby the element is the one and only element having a particular property and/or characteristic. For instance, a unique eSIM cannot have a duplicate eSIM.

As used herein, the term "security" generally refers and without limitation to protection of the data and/or software. For example, access control data security ensures that the data and/or software associated with an access control client is protected from theft, misuse, corruption, publication and/or tampering, by unauthorized activities, and/or malicious third parties.

Generally, it is appreciated that software is more flexible than hardware; for example, software is easy to copy, modify, and distribute. Additionally, software can often be made less costly, more power efficient, and physically smaller than hardware equivalents. Accordingly, while conventional SIM operation makes use of physical form factors such as cards (UICCs), current areas of research are focused toward virtualizing SIM operation within software.

However, the sensitive nature of SIM data (e.g., subscriber specific information, etc.) requires special consideration. For example, various portions of SIM data are unique to subscribers, and should be carefully guarded from malicious third parties.

Moreover, each SIM represents a contracted for amount of access to finite network resources; thus, duplication, destruction, and/or reclamation of SIMs must be managed to prevent over and/or under utilization of network resources, as well as subrogation of service provider fees or revenue.

Incipient solutions for SIM operation emulate an UICC as a virtual or electronic entity such as e.g., a software application, hereafter referred to as an Electronic Universal Integrated Circuit Card (eUICC). The eUICC is capable of storing and managing one or more SIM elements, referred hereafter as Electronic Subscriber Identity Modules (eSIM). Accordingly, new network infrastructures are required which are specifically adapted to handle the various requirements of eSIM distribution and operation to eUICCs. Specifically, such solutions should ideally have capabilities for: (i) enforcement of conservation for virtualized eSIMs, (ii) distributed operation, and (iii) disaster recovery.

Figure 2:
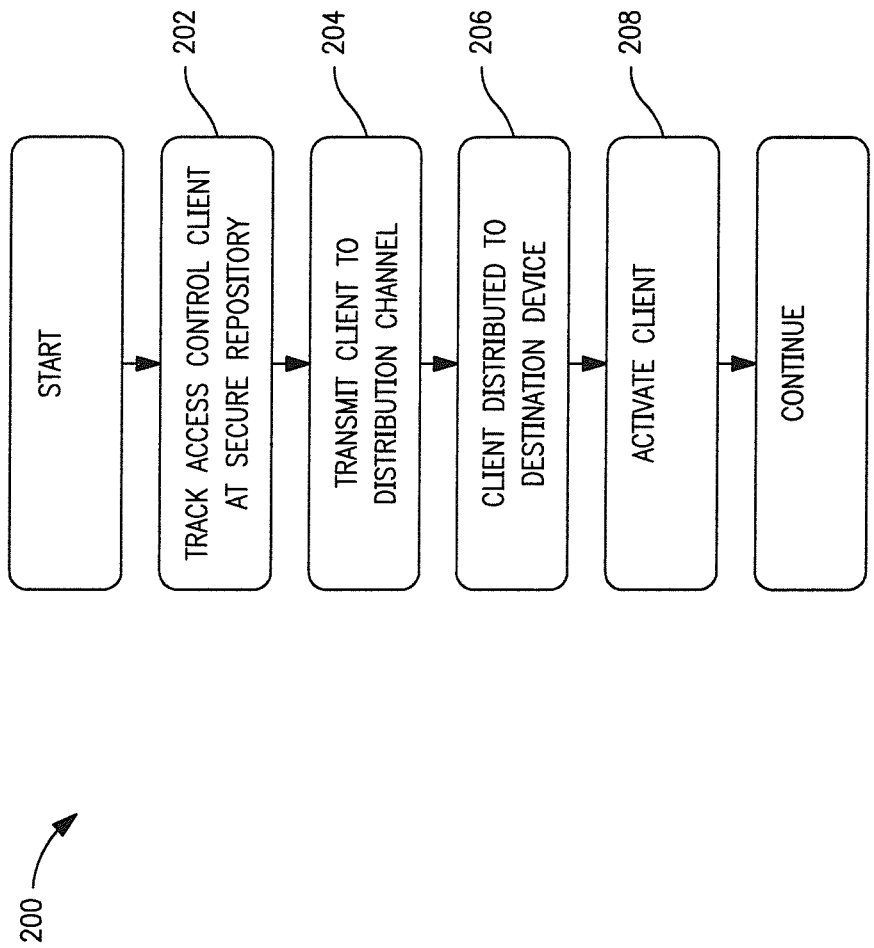
FIG. 2 is a logical flow diagram illustrating one embodiment of a generalized method for efficiently distributing and storing virtual access control clients within a network, according to the present invention.

Referring now to FIG. 2, a generalized method 200 for efficiently distributing virtual access control clients within a network is disclosed.

At step 202 of the method 200, one or more access control clients (e.g., eSIMs) are stored and tracked within secure repositories. In one embodiment, the secure repository includes one or more of a tracking database, a security module for encrypting and decrypting access control clients based at least in part on information derived from the tracking database, and secure storage for access control clients.

The tracking database includes information indicative of access control client distribution, and access control client transaction data. In one exemplary implementation of this embodiment, the transaction data includes a listing of deployed eSIMs, and the challenges issued, and/or unique identifiers used, etc. In one variant, described in greater detail within U.S. Provisional Patent Application Ser. No. 61/472, 109 filed on Apr. 5, 2011 and entitled "APPARATUS AND METHODS FOR STORING ELECTRONIC ACCESS CLIENTS" (now U.S. patent application Ser. No. 13/093,722 filed Apr. 25, 2011, of the same title) previously incorporated by reference in its entirety, a secure protocol between transferring devices ensures that every eSIM of the distributed eSIM population is only transferred among trusted devices. Alternately, the secure protocol may ensure that only encrypted eSIMs are distributed to devices which are not trusted. In some variants, the trusted protocol is based on a challenge/response protocol. In alternate variants, the trusted protocol is based on an exchange of a digital security certificate signed by a mutually trusted third party.

In one exemplary embodiment, the secure repository ensures that access control clients are only transferred between devices that conform to a standard trusted relationship. The trusted relationship further specifies that when a first device successfully transfers an access control client, the first device deletes, deactivates or otherwise renders its copy unusable. In this manner, the access control client can remain unique and conserved throughout transfer.

In various embodiments, the tracking database additionally tracks access control client qualities including for example: (i) access control clients which have been distributed to customers, (ii) access control clients which have not yet been distributed (awaiting activation), (iii) activated access control clients, (iv) deactivated access control clients, (v) access control clients awaiting activation, (vi) access control clients assigned to a device, (vii) access control clients assigned to an account, and (viii) access control clients available for assignment. Similarly, the tracking database may track states such as for example: (i) current state, (ii) expected state, (iii) previous state, (iv) last known state, and (v) initial state. Common examples of a state variable include, but are not limited to, a counter value, an encrypted value, a challenge variable, a response variable, etc.

For example, in one exemplary challenge-response scheme, a challenge variable is an input cryptographic vector, which can be manipulated, transformed, and/or calculated to generate a response vector. The manipulation, transformation, and/or calculation is a secret protected by the access control client of the device. In other example, a counter-based unique identifier uses a unique counter value as a secret that is protected by the access control client of the device. Common other types of states may be based on a large and pseudorandom state machine, such as for example, a Linear Feedback Shift Register (LFSR) based state machine or other such mechanism.

The security module is in one embodiment configured to encrypt or decrypt access control clients based at least in part on instructions from the tracking database. In particular, the security module is configured to encrypt access control clients for delivery to the desired destination device. In fact, in one exemplary embodiment, all transferred eSIMs must be encrypted (i.e., eSIMs cannot be transferred to any device in their unencrypted form). Similarly, the security module is configured to decrypt access control clients received from user devices. In one variant, described in greater detail within U.S. Provisional Patent Application Ser. Nos. 61/407,866 filed on Oct. 28, 2010 and entitled "METHODS AND APPARATUS FOR STORAGE AND EXECUTION OF ACCESS CONTROL CLIENTS" (now U.S. patent application Ser. No. 13/080,521 filed on Apr. 5, 2011, of the same title) previously incorporated herein, each device is given unique device keys and endorsement certificates which can be used to provide updates and/or eSIMs to the user equipment in the "field". The user equipment can trust an encrypted eSIM delivered with the device key, and the security module can trust information encrypted with the device's key.

Similarly, in some embodiments, the security module is further configured to decrypt an eSIM for SIM application execution. For example, in one scenario, a user device can decrypt an eSIM for use. The eSIM application generally encompasses access control clients such as the aforementioned USIM, CSIM, ISIM, SIM, RUIM, etc. It is further understood that each eSIM can be associated with a user account, thus an "eSIM" may broadly encompass multiple access control clients (e.g., a user may have a USIM and a SIM associated with the same eSIM account).

In yet another scenario, the security module may encrypt an eSIM for itself. For example, a security module may encrypt an eSIM for itself, and store the encrypted eSIM to persistent storage for later use.

In some embodiments, security module encryption scheme may be based on an asymmetric key pair; or alternately, the security module encryption scheme may use a symmetric key pair. As a brief aside, a public/private key pair is based on a secret private key, and a publishable public key. Public/private key schemes are considered "asymmetric", as the key used to encrypt and decrypt are different, and thus the encrypter and decrypter do not share the same key. In contrast "symmetric" key schemes utilize the same key (or trivially transformed keys) for both encryption and decryption. The Rivest, Shamir and Adleman (RSA) algorithm is one type of public/private key pair cryptography that is commonly used within the related arts, but it will be recognized that the present invention is in no way limited to the RSA algorithm (or for that matter asymmetric or symmetric key pairs).

Public/private cryptography schemes can be used to encrypt a message, and/or generate signatures. Specifically, a message can be encrypted with a private key, and decrypted with the public key, thereby assuring that the message has not been altered in transit. Similarly, a signature generated with the private key can be verified with the public key, assuring that the entity generating the signature is legitimate. In both uses, the private key is kept hidden, and the public key is freely distributed.

In one exemplary embodiment, the secure storage is volatile computer-readable media that is configured to store access control client data and files. The secure storage is a shared memory containing encrypted access control clients that is coupled to both the tracking databases and security modules. Shared memory access implementations allow both the tracking databases and security modules to operate on a coherent database (e.g., no requirement for synchronizing data between disparate memory pools). Volatile memory requires power to retain memory contents; which can be desirable for certain implementations because removing volatile memory will erase the memory (further improving security). Volatile memory is also generally faster than equivalent non-volatile memory.

In some embodiments of the invention, the secure storage enables multiple devices access to the same pool of access control clients. The secure storage may not be physically coupled between the tracking databases and security modules, but may be accessible via a network. In distributed facility arrangements, the secure storage may not even be logically shared. For example, remote databases may locally cache portions of the access control client data and files, and periodically synchronize between one another to ensure that all devices are in agreement.

The secure storage may also be physically and/or logically protected. For example, the secure storage may be protected within a Hardware Security Module (HSM), where the HSM is configured to destroy itself if forcibly opened/accessed. More generally, the tracking database, security modules, and secure storage will typically be protected within a trusted boundary. Common implementations of trust boundaries include both physical boundaries (e.g., physical isolation, etc.), and/or logical boundaries (e.g., encrypted communication, etc.). Furthermore, while the foregoing logical entities (tracking database, security modules, and secure storage) are primarily described as coherent or unitary entities, it is appreciated that in most network infrastructures, these logical entities will be composed of multiple discrete apparatus (which may even be geographically disparate) operating in tandem.

For example, in one embodiment, the tracking database is a community of multiple discrete database apparatus that execute tracking database software, and communicate among one another to maintain data synchronization. Similarly, the logical security modules can be composed of multiple discrete security modules; in one such variant, the security modules are entirely directed by the tracking database and do not synchronize with one another.

Referring again to FIG. 2, at step 204, one or more access control clients are transmitted to one or more distribution locations from the secure repositories. In one exemplary embodiment, a distribution location is an access control client depot that is configured to store encrypted access control clients for distribution to their respective destinations. Since the access control clients are encrypted and cannot be used by devices other than the destination device, multiple depots can be loaded with copies of the encrypted access control clients.

In one exemplary implementation, the encrypted access control clients are stored such that access control clients can be delivered in an uncontrolled fashion (i.e., each of the depots does not need to synchronize its transactions with the other depots, or notify a network centralized entity). Each of the copies is encrypted for the destination device, where the destination device is a trusted device. In one such embodiment, the destination device is configured to download the encrypted access control client only once. Once the access control client has been downloaded, the other copies of the access control client are "stale" and can be removed, deleted, or rendered inactive thereafter. Malicious third parties cannot decrypt the access control client, nor activate an encrypted copy (stale or otherwise).

The secure repositories may provide access control clients to the one or more distribution locations in bulk. For example, a SIM vendor may provide a large number of eSIMs in large lots (e.g., thousands of eSIMs at a time). Alternately, the secure repository may provide one eSIM at a time; for example, in some embodiments, a user may "park" their unused eSIMs within an eSIM depot, either temporarily (such as to transfer to another device), or for longer term storage.

Various embodiments of the present invention additionally include the addition of metadata that is associated with each access control client stored within the distribution locations. The metadata is securely stored, but can be accessed by the distribution apparatus to facilitate inventory management. For example, an eSIM depot may encrypt metadata with its own key (as opposed to a key specific to an eSIM, or destination device), such that the eSIM depot can properly identify an encrypted eSIM. Common examples of metadata may include, but are not limited to: identifying information, issuer information, network information, account information, status information, etc.

In some implementations, the metadata can be further queried and/or accessed by external entities. For example, an eUICC appliance may need to periodically check or update eSIM depot metadata (e.g., to determine inventory, identify stale information, etc.). In another such example, a mobile device user can request information on parked eSIMs, etc. located at a particular eSIM depot.

At step 206, the requested access control client is distributed from at least one of the distribution locations to a destination device. Due to the flexibility of distribution models, many different schemes are envisioned, and will be recognized by those of ordinary skill when provided the present disclosure. The following subsections describe several eSIM distribution schemes that are illustrative of the broad variety of schemes suitable for operation in accordance with various aspects of the present invention.

"Pull" and "Push" eSIM Delivery—

In "pulled" eSIM delivery, a eSIM depot delivers an eSIM in response to initial request originating from a user device. Pull delivery is the simplest delivery scheme; a user can request eSIMs from any of a number of eSIM depots at the user's desire.

In contrast, during "pushed" eSIM delivery, the eSIM depot initiates the delivery of an eSIM (or notification thereof) to a user device. Push delivery is a more complex delivery scheme, since some coordination between eSIM depots may be required to prevent pushing multiple redundant copies of an eSIM to a single device.

In some cases, push and pull delivery schemes can be combined; for example, a user can request an eSIM, the eSIM depot may indicate that it is currently unable to fulfill the request. At a later point, the eSIM depot can push an eSIM to the user. In another such example, an eSIM depot may push an eSIM notification to a user, where the notification is valid for a time period (e.g., a promotional offer, trial period, etc.). If the user is interested in the eSIM, the user can subsequently pull an eSIM from the eSIM depot.

Still other schemes for eSIM delivery useful in conjunction with push and/or pull eSIM delivery are described in greater detail within U.S. Provisional Patent Application Ser. No. 61/354,653 filed on Jun. 14, 2010 and entitled "METHODS FOR PROVISIONING SUBSCRIBER IDENTITY DATA IN A WIRELESS NETWORK" (now U.S. patent application Ser. No. 12/952,089 filed on Nov. 22, 2010 and entitled "APPARATUS AND METHODS FOR PROVISIONING SUBSCRIBER IDENTITY DATA IN A WIRELESS NETWORK"), previously incorporated by reference in its entirety.

Reserved eSIM Delivery—

In some models, an eSIM depot may reserve a specific eSIM for a particular user. For example, where a new customer purchases a device from an online store, the store may identify one or more eSIMs which are reserved for the customer's purchased device. In some cases, the store may ship the device to the customer, and provide the reserved eSIMs to the eSIM depots. When the customer first operates their newly purchased device, the device contacts the eSIM depots to request the reserved eSIMs. Other variations on such reservation-based eSIM delivery are described in greater detail within U.S. Provisional Patent Application Ser. No. 61/408,504 filed on Oct. 29, 2010 and entitled "ACCESS DATA PROVISIONING SERVICE" (now U.S. patent application Ser. No. 13/078,811 filed on Apr. 1, 2011, and entitled "ACCESS DATA PROVISIONING APPARATUS AND METHODS"), previously incorporated by reference in its entirety.

Archival (Backup) eSIM Delivery—

In still another example, it is readily appreciated that the eSIM depot may also serve as a storage location for unused eSIMs. For example, a customer may park their own eSIM when not in use at an eSIM depot; at a later point, the customer may retrieve their eSIM (on their device, or on a different device), and reinstate operation. In many cases, the customer will additionally encrypt the eSIM prior to parking the eSIM within the eSIM depot; for example, the customer encrypts the eSIM for their current device such that only their current device can reinstate the eSIM. In applications where the customer does not know the destination device (e.g., during transfer to a new device), their current device may encrypt the eSIM with, for example: a generic key, their own key (which would necessitate decryption and reencryption at a later point), etc.

Postponed eSIM Delivery

In still another distribution scheme, the eSIM depot can facilitate postponed delivery, such as the type described in U.S. Provisional Patent Application Ser. No. 61/354,653 filed on Jun. 14, 2010 and entitled "METHODS FOR PROVISIONING SUBSCRIBER IDENTITY DATA IN A WIRELESS NETWORK" (now U.S. patent application Ser. No. 12/952,089 filed on Nov. 22, 2010 and entitled "APPARATUS AND METHODS FOR PROVISIONING SUBSCRIBER IDENTITY DATA IN A WIRELESS NETWORK"), and Ser. No. 12/353,227 (now published as U.S. Patent Publication Number 2009/0181662) filed on Jan. 13, 2009, and entitled "POSTPONED CARRIER CONFIGURATION", the foregoing each incorporated by reference herein in its entirety. For example, in one such scenario, a mobile device is manufactured at a device factory and delivered to the user without an eSIM. At initial activation, the user's mobile device requests an eSIM from the eSIM depot.

At that time, the eSIM depot determines an appropriate eSIM for the mobile device based (e.g., on one or more criteria including, but not limited to: a desired Mobile Network Operator (MNO), a desired service plan, a device specific restriction, user input, etc.).

In another such scenario, a mobile device is purchased by a user at a sales kiosk or outlet, where the sales kiosk assigns the mobile device an eSIM type, but does not program an eSIM into the device. The user takes the mobile device home and downloads a new eSIM from the eSIM depot. Once downloaded, the mobile device can activate the eSIM.

Various combinations and permutations of the foregoing schemes will be recognized by ones of ordinary skill in the related arts, given the contents of the present disclosure.

At step 208 of the method 200, the destination device activates the delivered access control client. In one exemplary embodiment, activation of the delivered access control client is performed between the destination device and an activation service, such as an Authentication Center (AuC) or similar entity of a Mobile Network Operator (MNO). For example, in one exemplary embodiment, the mobile device requests activation from an activation service. The activation service verifies the eSIM (e.g., with a cryptographic challenge and response transaction, etc.), and if successful, activates the eSIM.

Exemplary Network Architecture for eSIM Distribution—

Figure 3:
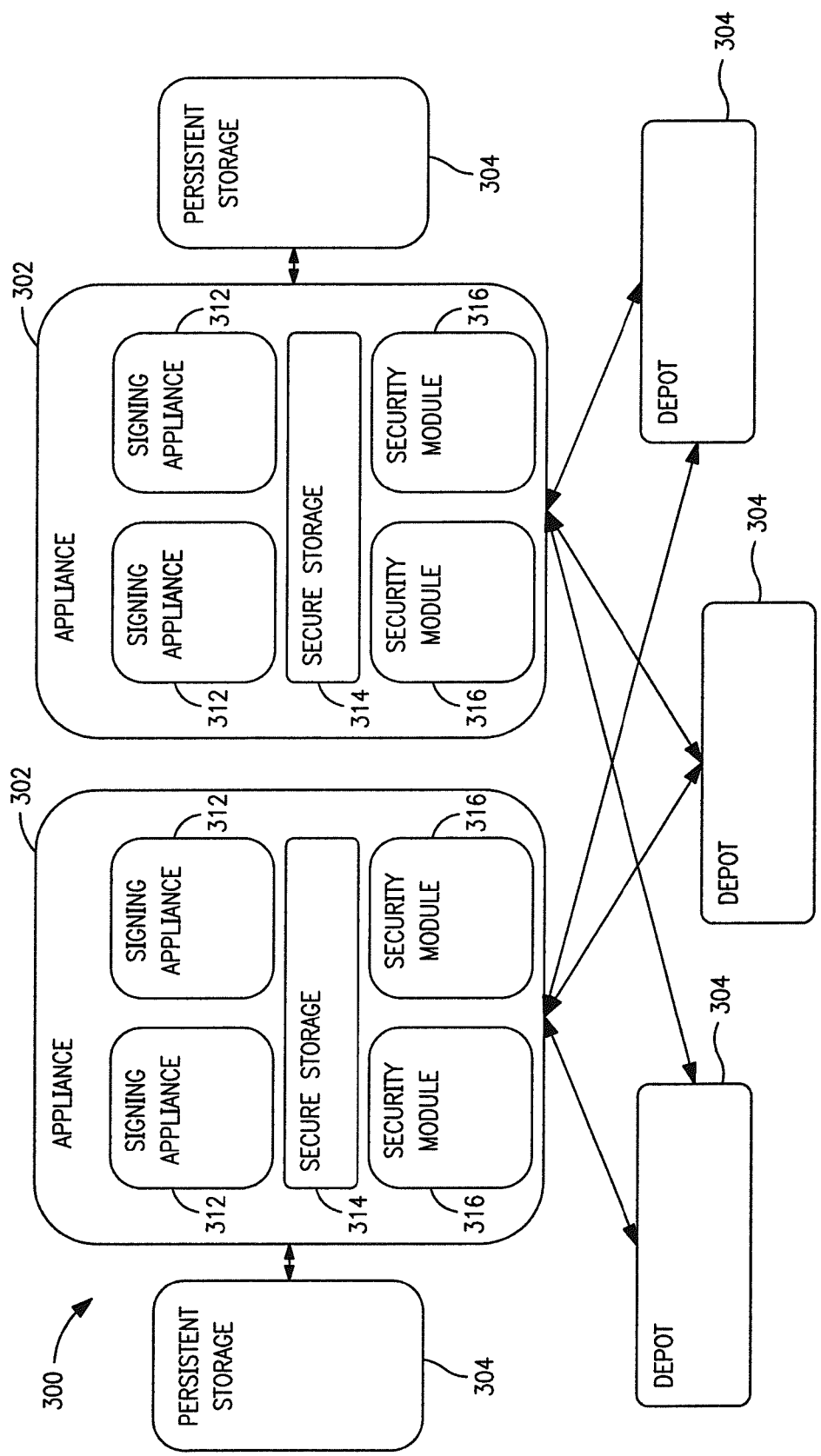
FIG. 3 is a block diagram of one exemplary network architecture useful for distributing and storing access control clients, according to the present invention.

Referring now to FIG. 3, one exemplary embodiment of a network architecture and system is disclosed. The illustrated system 300 is composed of several logical entities, including: (i) a number of eUICC appliances 302, (ii) a number eSIM depots 304, and (iii) associated persistent backup storage 306, each of which are now described in greater detail.

eUICC Appliance(s)—

The eUICC appliance(s) 302 of FIG. 3 is/are responsible for ensuring that the current population of eSIMs remains both unique and conserved. Specifically, the eUICC appliances must ensure that only one (1) unique eSIM is available for use at any time; i.e., no two (2) eUICC appliances have the same eSIM. Each time an eSIM is transferred between eUICC appliances, the transferring eUICC appliance deletes, deactivates or otherwise renders its copy unusable, such that only the transferred eUICC is active. In actual implementation, eUICC appliance functionality is embodied as an appliance "cluster", which is an array of eUICC appliances that have been logically joined.

In one exemplary embodiment, eUICC appliances can communicate with other eUICC appliances, eSIM depots 304, and eUICCs of mobile devices. Alternately, in some networks, it may be useful to enforce communication between eUICC appliances only via eSIM depots 304 (i.e., the eSIM depots are the sole intermediaries for transfer, eUICC appliances cannot transfer eSIMs directly). Such limitations may help reduce the likelihood of a race condition during transfers. For example, in a direct eUICC appliance to eUICC appliance transfer, the eUICC appliances may have a brief moment of overlap when an eSIM exists in two appliances, and could be accidentally duplicated if the transaction is interrupted unexpectedly. By limiting transfers to occur only via eSIM depots, the transmitting eUICC appliance can delete its eSIM before the destination eUICC appliance receives the encrypted eSIM.

In one configuration, the eUICC 302 appliance is subdivided into three (3) logical entities: (i) a signing appliance 312, (ii) a security storage 314, and (iii) secure module 316. Common implementations of the eUICC appliance may consolidate the logical entities within a single apparatus, or alternately may implement the entities within multiple apparatus operating within a trusted boundary. For example, in one configuration, the security module is implemented as a separate hardened module with a dedicated processor and execution code base. In alternate configurations, the security module is implemented within a larger logical entity (e.g., including the signing appliance and security storage) that is implemented within a secure processor. In yet other embodiments, multiple security modules are connected to servers running other logical entities; e.g., a distributed signing entity application, etc. Common implementations of trust boundaries include both physical boundaries (e.g., physical isolation, etc.), and/or logical boundaries (e.g., encrypted communication, etc.) In still other implementations, the aforementioned entities may be further duplicated to offer desirable redundancy, load capacity, etc.

The signing appliance 312 is responsible for tracking the population of eSIMs, transaction data associated therewith (e.g., challenges issued, unique identifiers used, etc.). In one exemplary embodiment, the signing appliance tracks the eSIM (e.g., Integrated Circuit Card ID (ICCID)), and the last issued challenge and/or unique transaction identifier(s). In one such variant, the last issued challenge and/or unique transaction identifier(s) are for pending transfers where the eSIM has not been imported (or exported) yet. In some variants, once a signing appliance has completed transfer, the transactional data is no longer needed, and can be deleted.

The security module 316 is configured to encrypt or decrypt eSIMs. The security module is instructed to encrypt or decrypt eSIMs for transfer by the signing appliance. The eSIMs are encrypted using an encryption key specific to the destination eUICC of the device (such as the eUICC public key, and/or secure session key). Furthermore, in certain embodiments, the security module can decrypt a received encrypted eSIM from a device, and store the decrypted eSIM within the secure storage. In one such embodiment, received encrypted eSIMs are decrypted with the security modules private key (the security module's public key is distributed to the originating device).

The signing appliance is coupled to secure storage 314 for storing data and files. The secure storage may be physically and/or logically protected. For example, the stored eSIMs may be encrypted within a Hardware Security Module (HSM), where the HSM is configured to destroy itself if forcibly opened/accessed. The secure storage stores encrypted data and files, such as encrypted eSIMs, and/or periodic backup data. In some embodiments, the secure storage may add additional internal layers of encryption/securitization. For example, in some embodiment, encrypted data and files can be backed up and duplicated to less physically secure or physically insecure persistent storage (the storage medium may be on generic computer media).

eSIM Depot—

The eSIM depot 304 provides a distributed interface for eSIM distribution. Multiple eSIM depots can store encrypted eSIMs and deliver encrypted eSIMs to devices to prevent excessive network traffic ("bottle necking") to any single network entity.

In one embodiment, eSIM depots 304 generate and respond to requests for eSIMs from other eSIM depots, eUICC appliances 302 and/or eUICCs of devices. In one variant, eSIM depots additionally respond to requests and updates to metadata that is associated with each eSIM. While metadata does not have any impact on network security, metadata is used to identify and characterize otherwise encrypted eSIMs. Thus, changes to metadata in this implementation can only be performed by trusted authorities which have been authenticated and/or authorized to modify metadata. The eSIM metadata may include for example: the eSIM Integrate Circuit Card ID (ICCID), eSIM vendor, Mobile Network Operator, subscriber account information (if any), and the current status of the eSIM (e.g., active, inactive, reserved, parked, etc.).

The eSIMs stored at the eSIM depot 304 are typically encrypted for the destination device. During normal operation, the destination device can request the encrypted eSIM from any of the eSIM depots. Responsively, the eSIM depot delivers the encrypted eSIM to the destination device, and notifies the other eSIM depots of delivery. The other eSIM depots can destroy their encrypted eSIM copies at their leisure (e.g., to free storage space, etc.).

It is of particular note that multiple versions of the encrypted eSIM may be distributed to eSIM depots. Since eSIM depots 304 do not verify state information and do not modify the contents of the encrypted eSIM, the same eSIM can be stored at multiple eSIM depots. However, the eSIMs are encrypted for a destination device (which will only activate one copy of the eSIM).

Persistent Storage—

In some embodiments, the eUICC appliances 302 or eSIM depots 304 are further coupled to external persistent storage 306 to assist in disaster recovery and/or archival services. Persistent storage may not be necessary in some implementations (e.g., where the eUICC appliance's internal storage is used for backup information, etc.).

In other embodiments, persistent storage is the only non-volatile storage for the system. For example, some network architectures may be restricted such that eSIMs are only unencrypted to volatile memory for use; this has the benefit of inter alia, adding an additional layer of protection in that if power to the volatile memory is lost (whether intentionally or otherwise), the unencrypted contents thereof will be lost as well. In such embodiments, eSIMs are stored in an encrypted form within a non-volatile memory for persistent storage, distribution, etc.

In one embodiment, during operation, persistent storage 302 is periodically written with a uniquely encrypted BLOB (Binary Large Object); the BLOB contains the eUICC appliance states, challenges, etc. and any other data necessary to recreate the current eUICC database. The BLOB can only be decrypted with the eUICC appliance security key. If, at a later point, the eUICC appliance 302 has an irrecoverable failure, the eUICC appliance can return to a previously stored BLOB. In one variant, the BLOB is exported to external storage, and does not need to be securely stored (the contents are encrypted); for example, the BLOB may be stored in a geographically remote location such as a warehouse, etc.

In an alternate embodiment, the eSIM depot periodically stores its BLOBs to the persistent storage. In some such variants, the eSIM depot may additionally encrypt metadata associated with the BLOB, thus enabling full state recovery in the event of for example a memory loss.

Example Operation—

The following discussion describes exemplary transactions that are illustrative of various aspects of the present invention.

Figure 4:
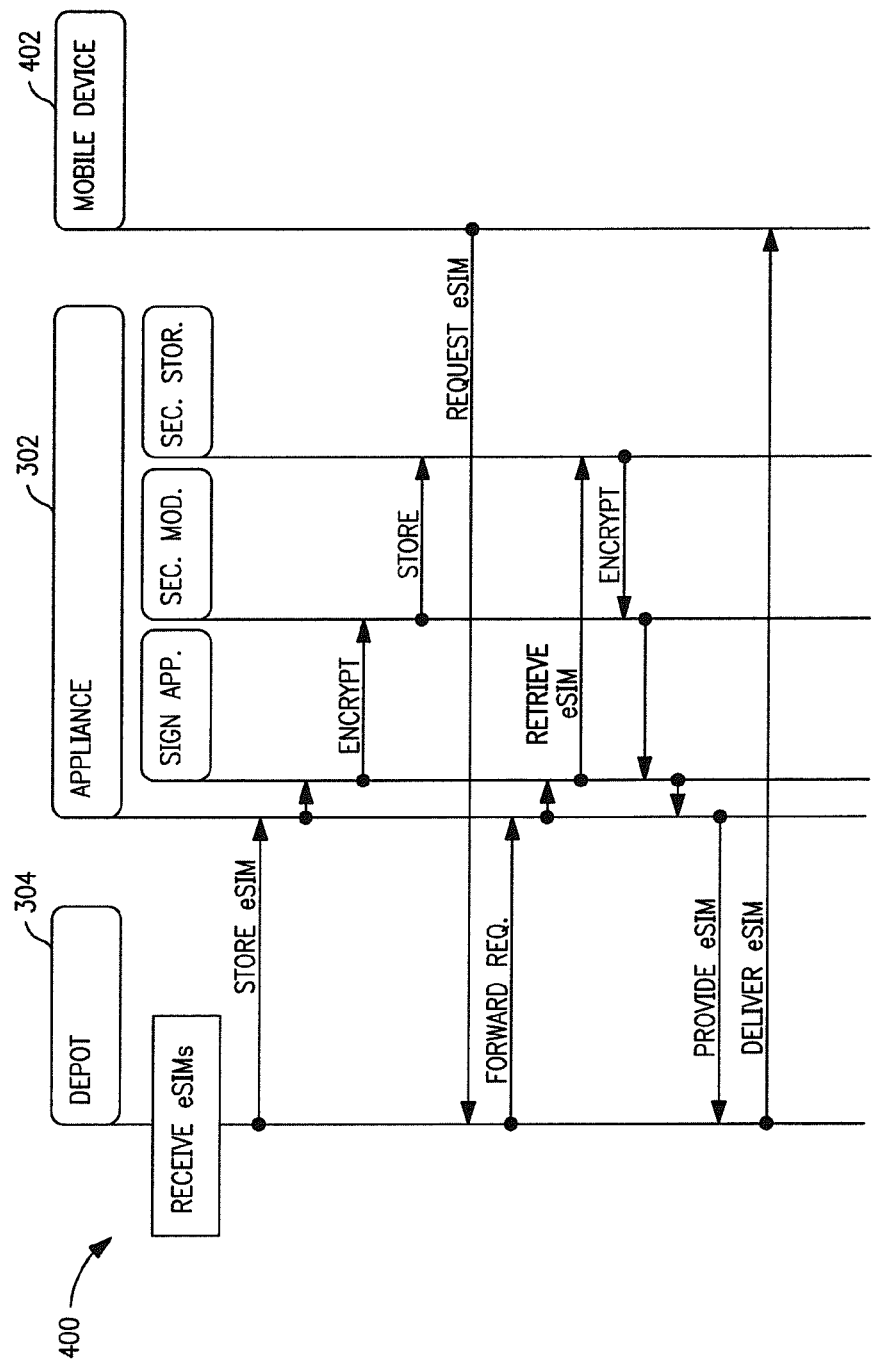
FIG. 4 is a ladder diagram of one exemplary lifecycle of an eSIM, illustrating various aspects thereof.

FIG. 4 illustrates one exemplary ladder diagram illustrating a typical lifecycle of an eSIM. Initially, the eSIM is provided by an eSIM vendor to an eSIM depot 304. Generally, eSIMs can be delivered via network transfer, or in some cases, physically delivered e.g., in a rackamount mass storage device, computer-readable media, etc. The delivered eSIMs are either delivered encrypted for the destination eUICC appliance 302, or delivered with encryption information such that the eUICC appliances can decrypt the eSIMs (e.g., a session key, a shared manufacturer specific key, etc.)

The eUICC appliance cluster (an array of eUICC appliances 302) retrieves the eSIMs from the eSIM depot 304, and allocates each eSIM to an eUICC appliance for storage. For each eSIM, the signing appliance 312 is notified of an allocated eSIM and records the eSIM identifiers, and associated transaction data. The security module 316 stores the eSIM to the secure storage 314. In some cases, the eSIM is encrypted for the eUICC appliance, and stored in encrypted format.

Referring now to a request event, a mobile device 402 requests an eSIM from the eSIM depot 304. The request includes the mobile device's eUICC public encryption key and a challenge. The request is forwarded to the eUICC appliance 302. The eUICC appliance verifies the challenge, and generates the proper response. Then, the eSIM appliance selects an appropriate encrypted eSIM from storage, decrypts the eSIM using its own private key, and reencrypts the eSIM for the mobile with the challenge response, using the mobile device's eUICC public encryption key. The eUICC appliance transfers the newly encrypted BLOB to any of the number of eSIM depots, and updates its internal records.

Any of the eSIM depots 304 can notify the mobile device 402 that an eSIM is available for retrieval. Responsively, the mobile device downloads the encrypted BLOB from the nearest eSIM depot, and decrypts the BLOB. If the challenge response is valid, the mobile device activates the decrypted eSIM. In some embodiments the eSIM depot can notify the eUICC appliance of successful delivery. Unused copies stored at the eSIM depots and the copy stored at the eSIM appliance can be deleted after successful delivery. Since each request for an eSIM includes a different challenge, the copies are stale and cannot be "replayed" for subsequent requests.

Apparatus—

Various apparatus useful in conjunction with the above described methods are now described in greater detail.

eUICC Appliance—

Figure 5:
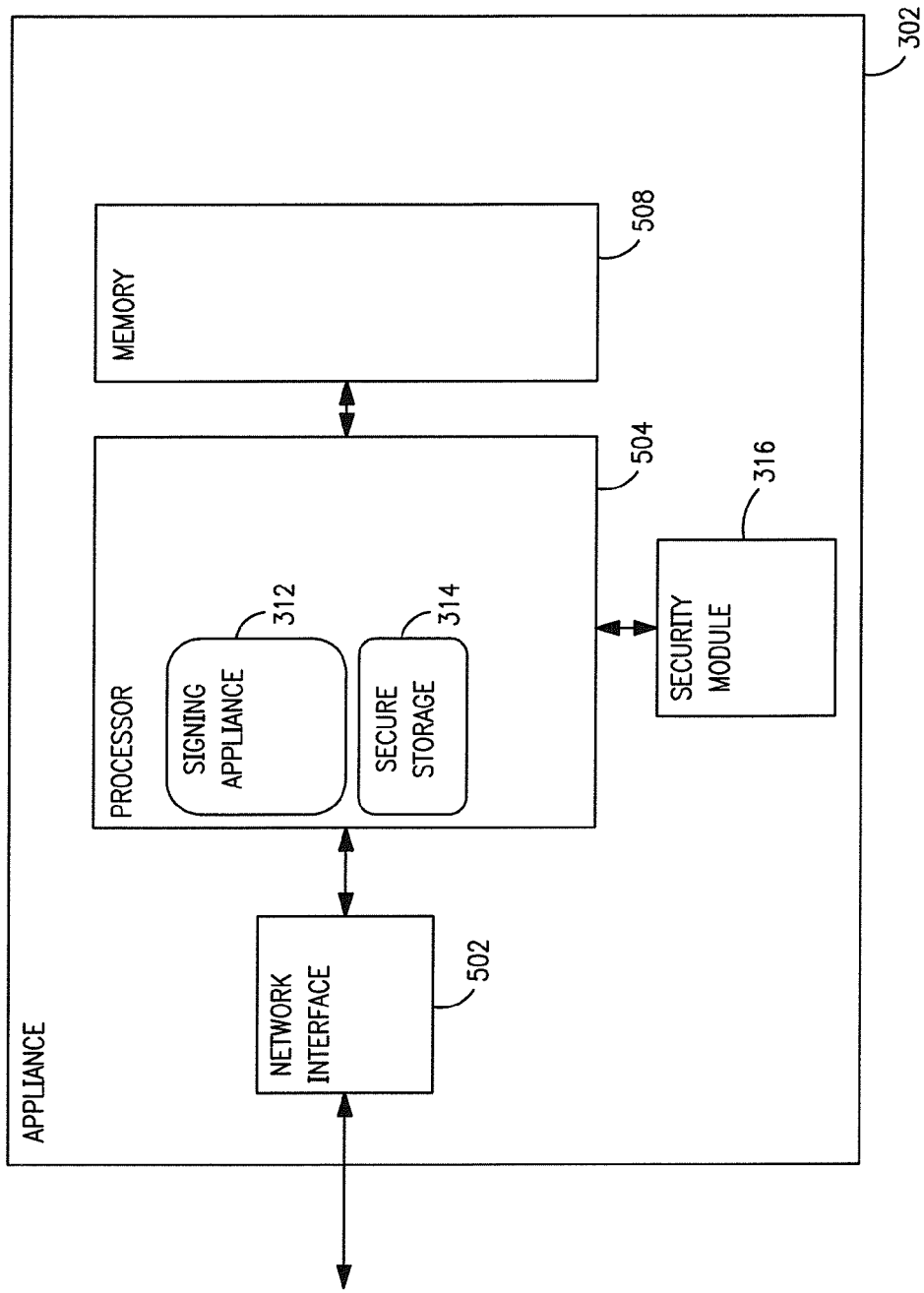
FIG. 5 is a block diagram illustrating one embodiment of an appliance apparatus, in accordance with the present invention.

FIG. 5 illustrates one exemplary embodiment of a eUICC appliance 302 in accordance with the present invention. The eUICC appliance may include a stand-alone entity, or be incorporated with other network entities. As shown, the eUICC appliance 302 generally includes a network interface 502 for interfacing with the communications network, a processor 504, and one or more storage apparatus 508. The network interface is shown connecting to the MNO infrastructure, so as to provide access to other eUICC appliances, and direct or indirect access to one or more mobile devices, although other configurations and functionalities may be substituted.

In one configuration, the eUICC appliance is capable of (i) establishing communications with another eUICC (either a eUICC appliance or client device), (ii) securely storing an eSIM, (iii) retrieving a securely stored eSIM, (iv) encrypting an eSIM for delivery to another specific eUICC, and (v) sending multiple eSIMs to/from an eSIM depot.

In the embodiment illustrated in FIG. 5, the eUICC appliance 302 includes at least a signing entity 312 running on the processor 504. The signing entity 312 processes requests that include: (i) a request to store an eSIM, (ii) a request to transfer a currently stored eSIM. The signing entity is also responsible for verifying requests to ensure that communication is received from another entity authorized to make such a request.

In one embodiment, the signing entity 312 verifies requests by executing challenge and response security exchanges. The challenge/response security protocol is configured to verify requests made by an unknown third party, based on appropriate generation of challenges and/or responses. Alternately, in another embodiment, the secure element can verify a digital certificate signed by a trusted authority.

The signing entity 312 is further configured to manage the available eSIMs. As illustrated in FIG. 5, the signing entity may provide information e.g., relating to the particular eSIM, the devices authorized to use the eSIM, the current state of the eSIM, and/or the current status of the eSIM ("available", "not available", "stale", etc.). Additional information may be maintained as well. The signing entity is configured to update or change information stored in the secure storage 314.

In the embodiment illustrated in FIG. 5, the secure storage 314 is adapted to store an array of access control clients. In one exemplary embodiment, an eUICC appliance stores an array of securely encrypted eSIMs to volatile storage. Volatile memory requires power to retain memory contents; common examples of volatile memory include Random Access Memory (RAM), Static RAM (SRAM), Dynamic RAM (DRAM), etc.

Each eSIM includes a small file system that includes computer readable instructions (the eSIM program) and associated data (e.g., cipher keys, integrity keys, etc.). In addition, each eSIM is additionally associated with transaction data (e.g., challenges issued, unique identifiers used, etc.) The security module 316 is configured in one variant to encrypt or decrypt access control clients based at least in part on instructions from the signing entity 312. The security module has a unique set of device specific encryption keys. The encryption keys include for example a public key, and a private key. The security module can decrypt an eSIM encrypted with its public key, using its private key. Additionally, the security module can encrypt an eSIM with another devices public key. Further discussion of public/private key encryption is detailed within U.S. Provisional Patent Application No. 61/407,866 entitled "METHODS AND APPARATUS FOR STORAGE AND EXECUTION OF ACCESS CONTROL CLIENTS" (now U.S. patent application Ser. No. 13/080,521 filed on Apr. 5, 2011, of the same title), previously incorporated herein.

When another device requests an eSIM from the eUICC appliance 302, the signing appliance retrieves the current state of the requested eSIM. This information can be used to determine if the requested eSIM can be provided. This validity check can be performed at the eUICC appliance, or occur at yet other locations; e.g., by comparing the state at another entity (such as an eSIM depot) to the last known state at the eUICC appliance.

If the validity check succeeds, then the signing appliance instructs the security module 316 to encrypt the associated eSIM. For example, in one embodiment, the security module encrypts the eSIM for the destination device (e.g., a client device, another eUICC appliance 302, etc.). Once an eSIM has been encrypted for the destination eUICC appliance, it can only be decrypted by the destination eUICC appliance. In some embodiments, each encrypted eSIM is further encrypted with a unique identifier, challenge, or challenge response. Upon successful transfer, the eSIM can be purged from the eUICC appliance inventory.

Similarly, when another device transfers an eSIM to the eUICC appliance 302, the signing appliance instructs the security module 316 to decrypt the associated eSIM for secure storage, and updates its associated transaction data.

eSIM Depot—

Figure 6:
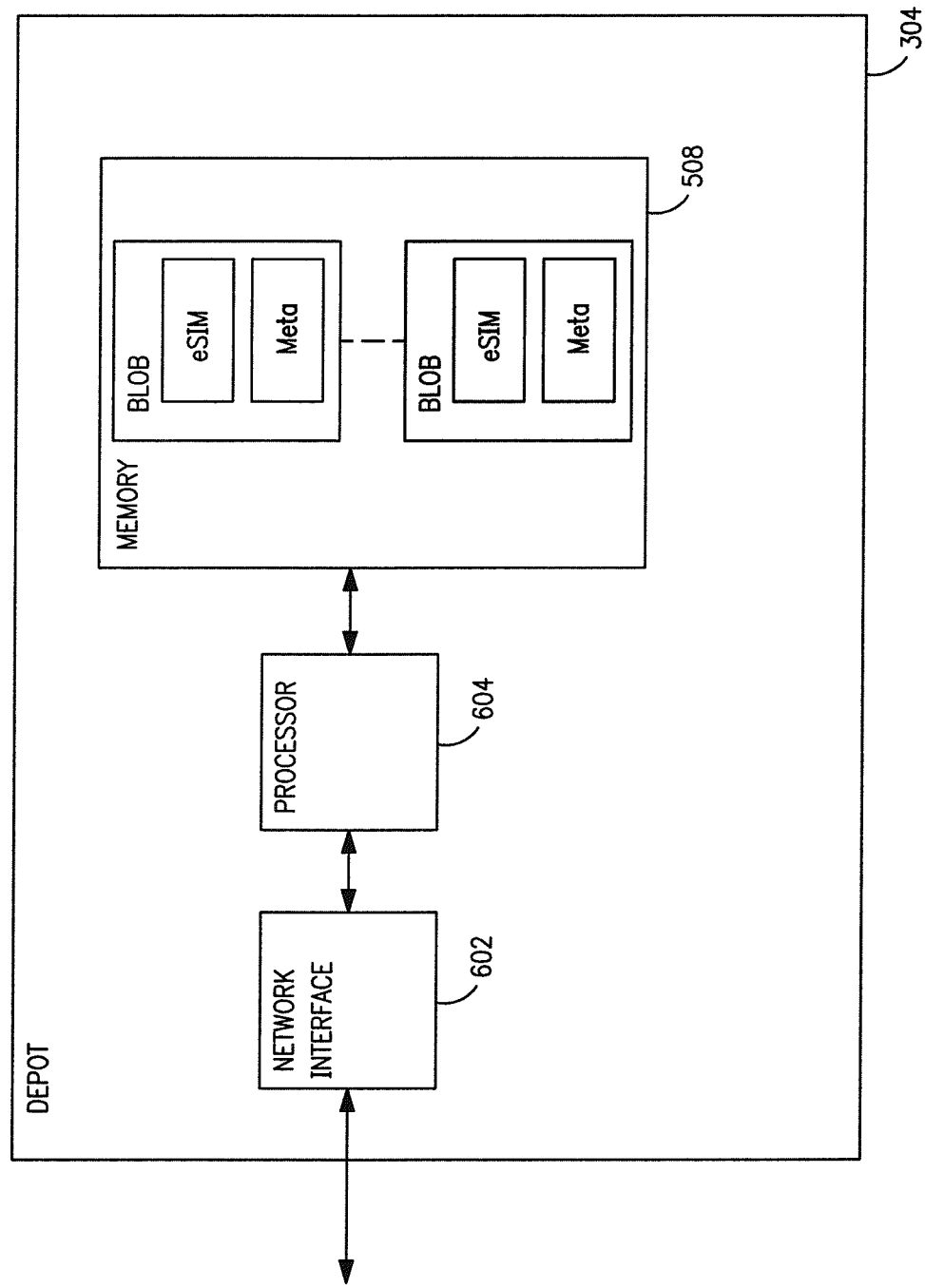
FIG. 6 is a block diagram illustrating one embodiment of a depot apparatus, in accordance with the present invention.

FIG. 6 illustrates one exemplary embodiment of an eSIM depot 304 in accordance with the present invention. The eSIM depot 304 may be implemented as a stand-alone entity, or be incorporated with other network entities (e.g., an eUICC appliance 302, etc.). As shown, the eSIM depot 304 generally includes a network interface 602 for interfacing with the communications network, a processor 604, and a storage apparatus 608.

In the illustrated embodiment of FIG. 6, the eSIM depot 304 is capable of: (i) inventory management of eSIMs (e.g., via associated metadata), (ii) responding to requests for encrypted eSIMs (e.g., from other eSIM depots, and/or eUICC appliances 302), (iii) managing subscriber requests for eSIMs.

For example, when an eSIM is stored at an eSIM depot 304 by a user, the eSIM may be stored with an intended destination (e.g., to facilitate transfer to another device), or parked indefinitely. In either case, the eSIM depot can provide the eSIM to the eUICC appliance for secure storage and for subsequent encryption for the destination device.

In the illustrated embodiment of FIG. 6, the storage apparatus 608 is adapted to store an array of encrypted access control clients. The eSIM depot stores an array of encrypted eSIMs as Binary Large Objects (BLOBs) within non-volatile memory. Common examples of non-volatile memory include, without limitation, flash, Hard Disk Drive, Read Only Memory (ROM), etc. In one such implementation, each BLOB is further associated with metadata that identifies the contents of the BLOB. For example, the metadata may contain: identifying information, issuer information, network information, account information, status information, etc.

User Apparatus—

Figure 7:
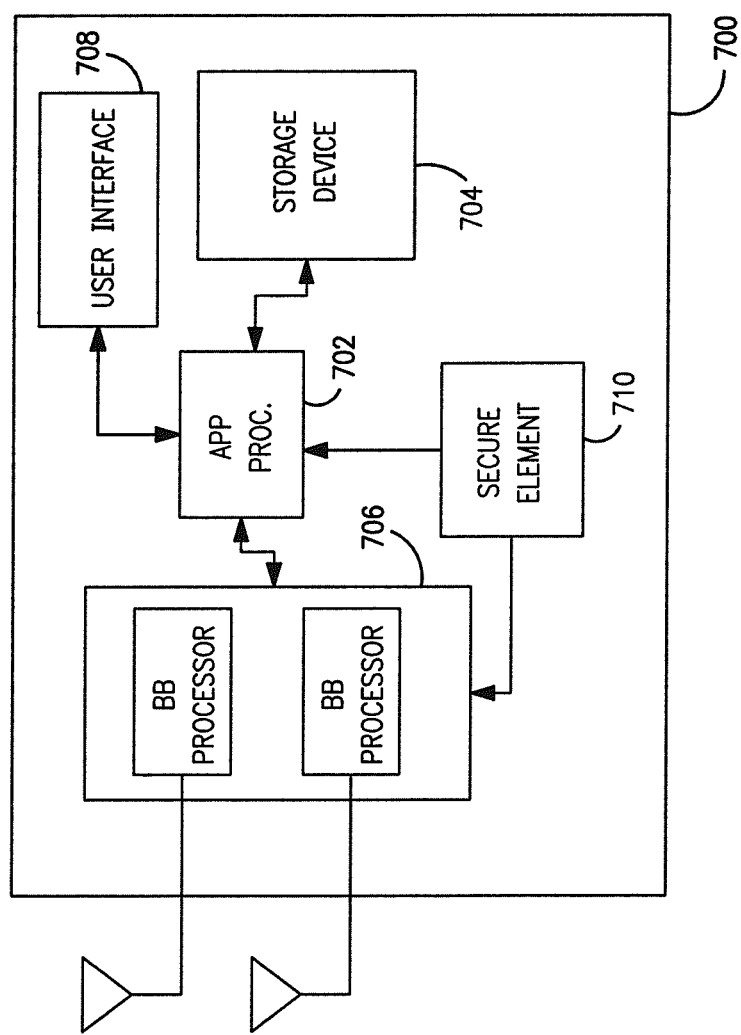
FIG. 7 is a block diagram illustrating one embodiment of a user equipment, in accordance with the present invention.

Referring now to FIG. 7, exemplary user apparatus 700 in accordance with various aspects of the present invention is illustrated.

The exemplary UE apparatus of FIG. 7 is a wireless device with a processor subsystem 702 such as a digital signal processor, microprocessor, field-programmable gate array, or plurality of processing components mounted on one or more substrates. The processing subsystem may also include an internal cache memory. The processing subsystem is in communication with a memory subsystem 704 including memory which may for example, include SRAM, flash, and/or SDRAM components. The memory subsystem may implement one or a more of DMA type hardware, so as to facilitate data accesses as is well known in the art. The memory subsystem contains computer-executable instructions which are executable by the processor subsystem.

In one exemplary embodiment, the device can include of one or more wireless interfaces 706 adapted to connect to one or more wireless networks. The multiple wireless interfaces may support different radio technologies such as GSM, CDMA, UMTS, LTE/LTE-A, WiMAX, WLAN, Bluetooth, etc. by implementing the appropriate antenna and modem subsystems.

The user interface subsystem 708 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

In the illustrated embodiment, the device includes a secure element 710 which contains and operates the eUICC application. The eUICC is capable of storing and accessing a plurality of access control clients to be used for authentication with a network operator. The secure element includes a secure processor executing software stored in a secure media. The secure media is inaccessible to all other components (other than the secure processor). Moreover, the secure element may be further hardened to prevent tampering (e.g., encased in resin) as previously described.

The secure element 710 is capable of receiving and storing one or more access control clients. In one embodiment, the secure element stores an array or plurality of eSIMs associated with a user (e.g., one for work, one for personal, several for roaming access, etc.), and/or according to another logical scheme or relationship (e.g., one for each of multiple members of a family or business entity, one for each of personal and work use for the members of the family, and so forth). Each eSIM includes a small file system including computer readable instructions (the eSIM program), and associated data (e.g., cipher keys, integrity keys, etc.)

The secure element is further adapted to enable transfer of eSIMs to and/or from the mobile device. In one implementation, the mobile device provides a GUI-based acknowledgement to initiate transfer of an eSIM.

Once the user of the mobile device opts to activate an eSIM, the mobile device sends a request for activation to an activation service. The mobile device can use the eSIM for standard Authentication and Key Agreement (AKA) exchanges.

Persistent Storage—

Figure 8:
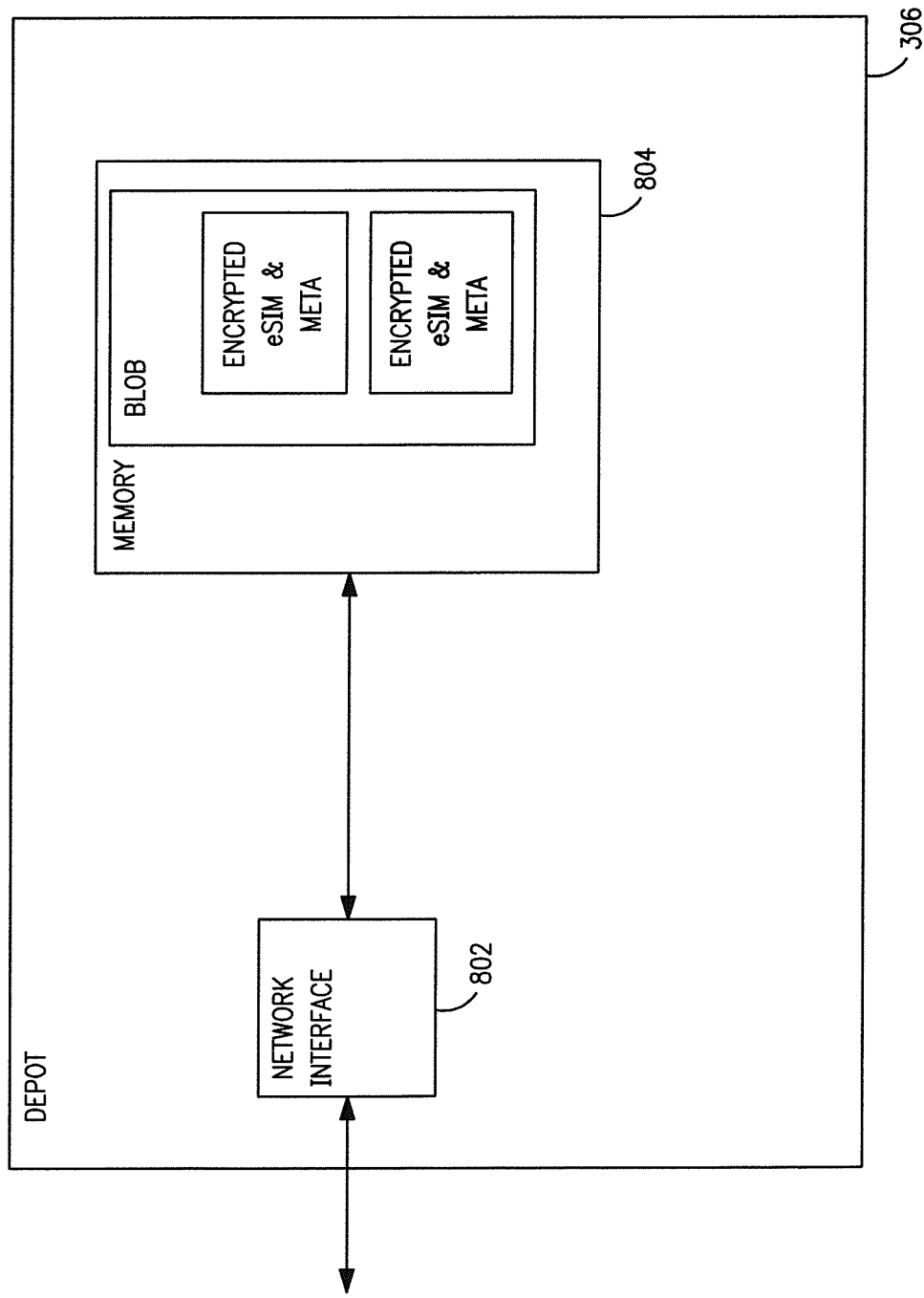
FIG. 8 is a block diagram illustrating one embodiment of a persistent storage apparatus, in accordance with the present invention.

FIG. 8 illustrates one exemplary embodiment of persistent storage 306 in accordance with the present invention. The persistent storage may be implemented as a stand-alone entity, or be incorporated with other network entities (e.g., an eUICC appliance 302, eSIM depot 304, etc.). As shown, the persistent storage generally includes an interface 804, and a storage apparatus 802.

The persistent storage is adapted to store an array of encrypted access control clients, and associated states to non-volatile storage. In one embodiment, the persistent storage stores an array of encrypted eSIMs and associated metadata as Binary Large Objects (BLOBs). Each BLOB may be uniquely encrypted by the storing device's key (e.g., the eUICC appliance, eSIM depot, etc.)

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for distributing access control clients, comprising:
   tracking distribution statuses of a plurality of access control clients that are stored within a secure repository;
   uniquely encrypting for a target mobile device a first access control client of the plurality of access control clients, wherein the target mobile device is configured to download the encrypted first access control client from any one of two or more distribution entities;
   transmitting the encrypted first access control client to each of the two or more distribution entities;
   removing the first access control client from the secure repository;
   updating a distribution status that corresponds to the first access control client to indicate:
      the removal of the first access control client from the secure repository, and
      the transmission of the encrypted first access control client to the two or more distribution entities; and
   in response to determining that the target mobile device has downloaded the encrypted first access control client from one distribution entity of the two or more distribution entities:
      removing the encrypted first access control client from each of the two or more distribution entities, and
      updating the distribution status to reflect the removal of the encrypted first access control client from each of the two or more distribution entities.

2. The method of claim 1, wherein the encrypted first access control client is not modified by the two or more distribution entities.

3. The method of claim 1, wherein tracking the distribution statuses includes maintaining distribution data associated with each access control client of the plurality of access control clients.

4. The method of claim 1, wherein tracking the distribution statuses includes maintaining transaction data associated with the each access control client of the plurality of access control clients.

5. The method of claim 1, wherein the target mobile device conforms to a standard trusted relationship.

6. The method of claim 5, wherein the target mobile device is verified based at least in part on a challenge-response scheme prior to downloading the encrypted first access control client.

7. The method of claim 1, wherein each access control client of the plurality of access control clients is an electronic Subscriber Identity Module (eSIM).

8. The method of claim 7, wherein each distribution entity of the two or more distribution entities is an eSIM depot.

9. A method for distributing access control clients, comprising:
   receiving, at each of two or more distribution locations, an access control client that is encrypted for a unique target device;
   receiving, at any one of the two or more distribution locations, a request from the unique target device for the encrypted access control client;
   transmitting the encrypted access control client to the unique target device; and
   responsive to receiving an indication that the encrypted access control client was successfully transmitted to the unique target device:
      at each of the two or more distribution locations, removing or rendering inactive the encrypted access control client.

10. The method of claim 9, wherein the encrypted access control client is transmitted to the unique target device without notifying a network centralized entity.

11. The method of claim 9, wherein the encrypted access control client is associated with metadata.

12. The method of claim 11, wherein the metadata includes identifying information associated with the encrypted access control client.

13. The method of claim 11, wherein the metadata includes information about an issuer of the encrypted access control client.

14. The method of claim 11, wherein the metadata includes account information associated with the encrypted access control client.

15. The method of claim 11, wherein the metadata includes status information associated with the encrypted access control client.

16. The method of claim 11, further comprising:
receiving, at any one of the two or more distribution locations, a request from the unique target device for the metadata; and
transmitting the metadata to the unique target device.

17. An appliance for distributing access control clients, the appliance comprising:
a signing appliance, wherein the signing appliance is configured to track distribution statuses of a plurality of access control clients;
a security module, wherein the security module is configured to uniquely encrypt the plurality of access control clients for target devices;
a processor; and
a storage device in data communication with the processor, wherein the storage device stores computer-executable instructions that, when executed by the processor, cause the appliance to:
receive from a target device a request for an access control client of the plurality of access control clients;
cause the security module to uniquely encrypt the access control client for the target device;
transmit the encrypted access control client to two or more distribution locations, wherein any one of the two or more distribution locations is capable of transmitting the encrypted access control client to the target device; and
cause the signing appliance to update a distribution status associated with the encrypted access control client to reflect the transmission of the encrypted access control client to each of the two or more distribution locations.

18. The appliance of claim 17, wherein the appliance additionally comprises a secure storage for locally storing the plurality of access control clients.

19. The appliance of claim 18, wherein each access control client of the plurality of access control clients is encrypted uniquely for the secure storage.

20. The appliance of claim 19, where the security module is additionally configured to, prior to encrypting the access control client for the target device, decrypt the access control client when it is encrypted for the secure storage.

21. The appliance of claim 17, wherein each access control client of the plurality of access control clients is an electronic Subscriber Identity Module (eSIM).

22. The appliance of claim 21, wherein each of the two or more distribution locations is an eSIM depot.

* * * * *